(12) United States Patent
Zhao et al.

(10) Patent No.: US 10,078,802 B2
(45) Date of Patent: Sep. 18, 2018

(54) METHOD AND SYSTEM OF DISCOVERING AND ANALYZING STRUCTURES OF USER GROUPS IN MICROBLOG

(71) Applicants: Peking University Founder Group Co., Ltd., Beijing (CN); PEKING UNIVERSITY, Beijing (CN); Beijing Founder Electronics Co., Ltd., Beijing (CN)

(72) Inventors: Liyong Zhao, Beijing (CN); Xiaoming Yu, Beijing (CN); Jianwu Yang, Beijing (CN); Yan Zheng, Beijing (CN)

(73) Assignees: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 568 days.

(21) Appl. No.: 14/760,051

(22) PCT Filed: Nov. 11, 2013

(86) PCT No.: PCT/CN2013/086818
§ 371 (c)(1),
(2) Date: Jul. 9, 2015

(87) PCT Pub. No.: WO2014/107988
PCT Pub. Date: Jul. 17, 2014

(65) Prior Publication Data
US 2015/0356444 A1    Dec. 10, 2015

(30) Foreign Application Priority Data
Jan. 9, 2013    (CN) .......................... 2013 1 0008052

(51) Int. Cl.
*G06N 5/04* (2006.01)
*H04L 12/58* (2006.01)
(Continued)

(52) U.S. Cl.
CPC ............... *G06N 5/04* (2013.01); *G06Q 10/06* (2013.01); *G06Q 50/01* (2013.01); *H04L 51/32* (2013.01); *H04L 51/34* (2013.01)

(58) Field of Classification Search
None
See application file for complete search history.

(56) References Cited

U.S. PATENT DOCUMENTS 8,396,855 B2 *   3/2013   Aggarwal .......... G06K 9/00677
                                                    707/709
8,909,646 B1 *  12/2014   Fabrikant ............... G06Q 50/01
                                                    707/737
(Continued)

FOREIGN PATENT DOCUMENTS

CN          102394798          3/2012

*Primary Examiner* — Alan Chen
(74) *Attorney, Agent, or Firm* — Brinks Gilson & Lione

(57) ABSTRACT

A method and system of discovering and analyzing structures of user groups in a microblog is provided in this invention. The method of discovering and analyzing structures of the user groups in a microblog comprises: acquiring information on behavior data of microblog users of a target group; constructing a microblog user association network based on the information on behavior data of the microblog users of the target group; acquiring at least one maximal clique from the microblog user association network; acquiring at least one core clique based on the maximal clique; and conducting behavior analysis on the user groups in the microblog based on the acquired maximal clique and/or the acquired core clique. Using the method and system of discovering and analyzing structures of user groups in a microblog provided in this invention, complicated relation- (Continued)

ships among microblog users may be sufficiently identified and the speed of discovering and analyzing structures of user groups in a microblog may be improved to meet the demand for large scaled data processing.

8 Claims, 2 Drawing Sheets

(51) Int. Cl.
*G06Q 10/06* (2012.01)
*G06Q 50/00* (2012.01)

(56) References Cited

U.S. PATENT DOCUMENTS

| | | | |
|---|---|---|---|
| 2006/0271564 A1* | 11/2006 | Meng Muntz | G06Q 10/00 |
| 2007/0239694 A1* | 10/2007 | Singh | G06F 17/30958 |
| 2010/0257028 A1 | 10/2010 | Hillerbrand | |
| 2011/0103682 A1* | 5/2011 | Chidlovskii | G06K 9/6284 |
| | | | 382/159 |
| 2011/0173189 A1* | 7/2011 | Singh | G06F 17/30958 |
| | | | 707/722 |
| 2013/0198191 A1* | 8/2013 | Lara Hernandez | |
| | | | G06F 17/30867 |
| | | | 707/737 |

* cited by examiner

METHOD AND SYSTEM OF DISCOVERING AND ANALYZING STRUCTURES OF USER GROUPS IN MICROBLOG

CROSS-REFERENCE TO RELATED APPLICATIONS

This application is a National Stage of International Application No. PCT/CN2013/086818, filed on Nov. 11, 2013, which claims priority to Chinese Patent Application No. 201310008052.9, filed on Jan. 9, 2013, both of which are hereby incorporated by reference in their entireties.

TECHNICAL FIELD

This invention relates to the technical field of discovering structures of user groups in a microblog in the Internet and knowledge mining, and more particularly, to a method and system of discovering and analyzing structures of user groups in a microblog.

DESCRIPTION OF THE RELATED ART

With the increasingly development of the microblog serving platforms, a complicated relationship network has been formed by a huge amount of microblog user groups. Connection relationships among microblog users present patterns characterized by free scale, small world, high clustering, self-similarity, and the like, instead of purely random or otherwise purely regular, and varying over time. It has become a focus in current research how to discover penitential user groups closely associated with each other and further find group structure characteristics of a relationship network. However, current research methods mainly comprise single-data-entity attributes based analysis methods and complicated network based analysis methods. Wherein, the single-data-entity attributes based analysis methods, i.e., the content analysis based methods are capable of realizing clustering classification of similar microblog messages and in turn realizing classification of microblog users having similar behavioral habits. Compared with the traditional content analysis based methods, the complicated network based analysis methods put more emphasis on associations among data entities, and focus on making statistical analysis on data sets having group characteristics from the perspective of multiple relationships, structures, backgrounds, complicated systems and evolutions.

However, in the existing process of discovering and analyzing microblog user group structure, the inventors of this invention have recognized the following problems:

the single-data-entity attributes based analysis methods depend too much on experiences and prior knowledge, resulting in lacking the ability of processing unknown knowledge; also, those methods only determine whether a microblog user belongs to some known user categories or not, and hence the classification methods are too simple and are incapable of sufficiently indicating complicated relationships existing among the users. While the complicated network based analysis methods, due to limitations of the existing algorithms, cause the data processing scale to be incapable of satisfying the existing demands and result in the limited processing speed as well.

The descriptions on the prior art given herein shall not be considered as acknowledgement or suggestion that its content is well known or the general knowledge in the art before the application date or the priority date claimed with any rights.

SUMMARY OF THE INVENTION

In order to solve one or more defects of the state of the art, the object of this invention is to provide a method and system of discovering and analyzing structures of user groups in a microblog.

A method of discovering and analyzing structures of user groups in a microblog is provided in this invention, comprising:

acquiring information on behavior data of microblog users of a target group;

constructing a microblog user association network based on the information on behavior data of the microblog users of the target group;

acquiring at least one maximal clique from the microblog user association network;

acquiring at least one core clique based on the maximal clique;

conducting behavior analysis on the user groups in the microblog based on the acquired maximal clique and/or the acquired core clique.

A system of discovering and analyzing structures of user groups in a microblog is provided in this invention, comprising:

an information acquiring unit, configured to acquire information on behavior data of microblog users of a target group;

an association network constructing unit, configured to construct a microblog user association network based on the information on behavior data of the microblog users of the target group;

a maximal clique acquiring unit, configured to acquire at least one maximal clique from the microblog user association network;

a core clique acquiring unit, configured to acquire at least one core clique based on the maximal clique;

an analysis unit, configured to conduct behavior analysis on the user groups in the microblog based on the acquired maximal clique and/or the acquired core clique.

The method and system of discovering and analyzing structures of user groups in a microblog provided in this invention acquires information on behavior data of microblog users of a target group; constructs a microblog user association network based on the information on behavior data of microblog users of a target group; acquires at least one maximal clique from the microblog user association network; acquires at least one core clique based on the maximal clique; conducts behavior analysis on the user groups in the microblog based on the acquired maximal clique and/or the acquired core clique. Using the method and system of discovering and analyzing structures of user groups in a microblog provided in this invention, complicated relationships among microblog users can be sufficiently identified and the speed of discovering and analyzing structures of user groups in a microblog can be improved to meet the demand for large scaled data processing.

DETAILED DESCRIPTION OF THE PREFERRED EMBODIMENT

Method and system of discovering and analyzing structures of user groups in a microblog provided in exemplary embodiments of this invention will now be described in detail with reference to the drawings. It should be noted that the relative arrangement of the components and steps, the numerical expressions, and numerical values set forth in these embodiments do not limit the scope of this invention unless it is specifically stated otherwise.

The following descriptions on at least one exemplary embodiment are merely illustrative in nature and are in no way intended to limit this invention, its application, or uses.

Techniques, methods and apparatus as known by one of ordinary skill in the relevant art may not be discussed in detail but are intended to be part of the granted specification where appropriate.

In all of the examples illustrated and discussed herein, any specific values should be interpreted to be illustrative only and non-limiting. Thus, other examples of the exemplary embodiments could have different values.

First, it is necessary to illustrate some relative concepts present in the following embodiments, particularly as follows:

group: a set of microblog users relatively closely associated with each other based on common interests, hobbies or other relations;

maximal clique: in a given graph G, for any subgraph G', let V(G') and E(G') represent a set of its nodes and a set of its edges respectively, if vi and vj belong to V(G') and there is ei,j belonging to E(G'), then the subgraph G' is a clique. If there is no other clique that includes G', G' is a maximal clique.

core clique: in a given graph G, for any node vi of V(G), because the maximal clique where vi locates contains a set of nodes associated most closely to vi, a set Ci (comprising all maximal cliques of vi) contains an adjacent area most intensively surrounding node vi and is referred to as a social relation circle of node vi. For any two nodes vi, vj, node vj is considered as part of social associations of node vi if the social relation circle of vi covers the vast majority of the social relation circle of vj, and this is called Ci includes Cj. If the social relation circle Ci of node vi is not included by the social circular of any other node, it is indicated that nodes in Ci have sufficiently close associations and are of an adequate scale, so that Ci may become a core of the given graph G independently.

Figure 1:
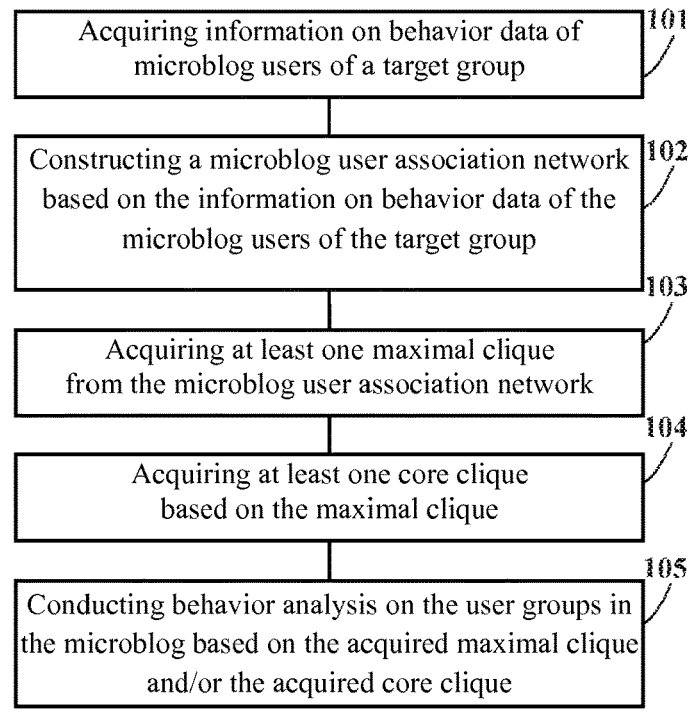
FIG. 1 is a flowchart of a method of discovering and analyzing structures of user groups in a microblog provided in an embodiment of this invention.

Based on the explanations for the above concepts, as shown in FIG. 1, a method of discovering and analyzing structures of user groups in a microblog is provided in an embodiment of this invention, the method comprising:

101: acquiring information on behavior data of microblog users of a target group; with respect to the information on behavior data of the microblog users of the target group, a microblog crawler may be used to collect, filter and store the information on behavior data. The information on behavior data of the microblog users comprises: microblog user attribute information, microblog user following information, microblog message forwarding information, and microblog message commenting information.

102: based on the information on behavior data of the microblog users of the target group, constructing a microblog user association network; in this step, on the basis of the information on behavior data of the users, the association relationships among the users are extracted and the microblog user association network is constructed. The association relationship is defined as follows:

(1) If there is a following relationship among the users, it is considered that there are association relationships among the users. The following relationship may be obtained through querying the following list of user;

(2) If there is no following relationship among the users, but there are many commenting and/or forwarding relationships among them, it is also considered that there are association relationships among the users. Commenting and/or forwarding occurred occasionally can not sufficiently indicate an inherent relationship among the users. It is a very complex problem to infer association relationships among the users from commenting and/or forwarding relationships. However, the commenting and/or forwarding relationships still reflect some internal regularities of things. Herein, an experimental conclusion of "three strikes law" is adopted. If user A has forwarded and/or put comments on a microblog message posted by user B more than three times, it is determined that there is an association relationship between user A and user B. As a more reasonable evaluation criterion, other decision conditions may be added, for example, if the number of commenting and/or forwarding actions is more than three, and user A puts comments on and/or forwards 30% or more of microblog messages posted by user B, it is determined that there is an association relationship between user A and user B.

(3) If there is not a following relationship among the users, nor is there a commending and/or forwarding relationship, it may be also considered that there are association relationships among the users if there is strong relevance among the users' microblog messages, comments and/or forwarded messages. The similarity among microblog messages is text similarity. Because microblog content is short in nature, and each piece of microblog content contains only a small amount of information, comparing each of microblog messages of two microblog users in turn cannot come to a good effect. Herein, an integral comparison strategy is adopted, that is, messages posted, forwarded or put out as comments by microblog users are regarded as a whole for integral similarity comparison.

(4) It is considered there is no association relationship among the users if none of the above three conditions is satisfied.

In accordance with the definition of the association relationship, the set of the information on behavior data of the microblog users of the target group acquired at step 101 are traversed to extract the association relationships among the microblog users in accordance with the definition of the association relationship.

Figure 2:
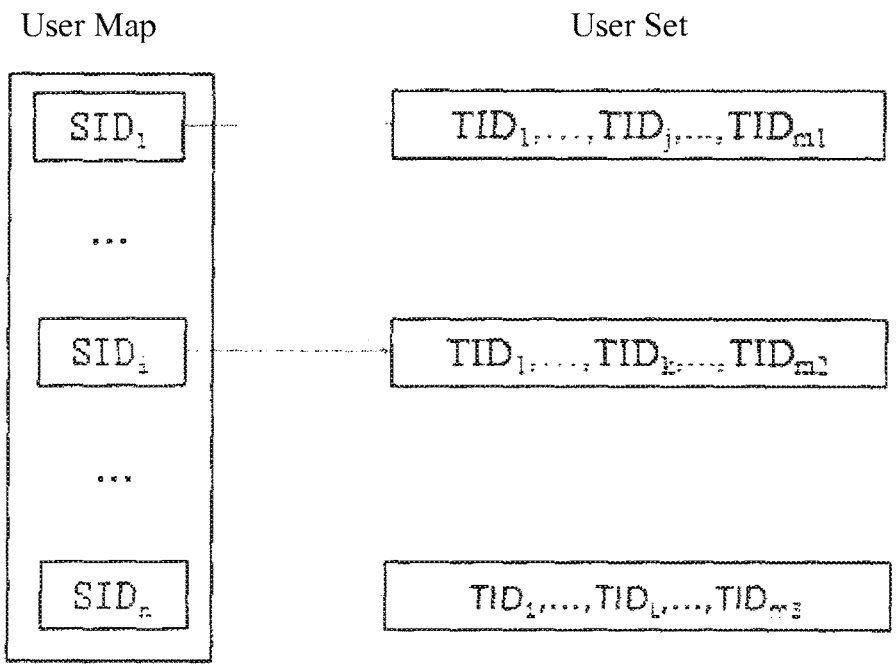
FIG. 2 is a schematic diagram of a composite data structure of user nodes and their corresponding association relationships in a microblog user association network provided in this invention.

Based on the processing of the step 101 and that of the step 102, a composite data structure map<set> composed of "map" and "set" is used to store a network structure of the association relationships among the microblog users (as shown in FIG. 2), wherein the "map" portion is used to store distinct microblog user nodes, each user node corresponding to a microblog user node, the distinct existing association relationships of which are stored by the "set" part.

Figure 3:
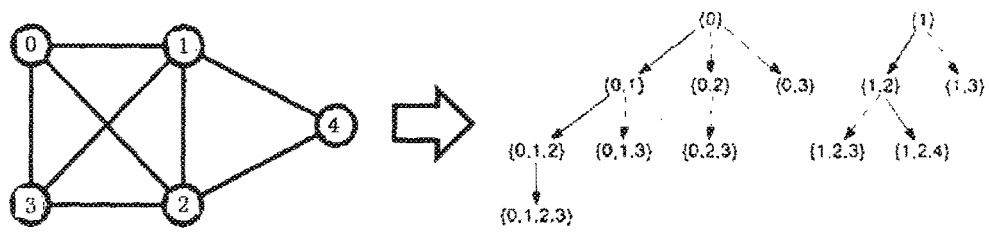
FIG. 3 is a schematic diagram of discovering a maximal clique in the microblog user association network provided in an embodiment of this invention.

103: acquiring at least one maximal clique from the microblog user association network; for example, as shown in FIG. 3, in this step, from an undirected and unweighted graph G, all maximal cliques are enumerated on the basis of a search-triangle method operated with a certain pruning strategy. In the following example, the symbol NL(v) represents, for numbered nodes, all nodes having numbers larger than v from all adjacent nodes of node v; TR(vi, vj) represents a set of nodes each of which may form a triangle with node vi and node vj; and, based on FIG. 3, a particular scheme for acquiring the maximal clique is as follows.

Depth traversal is conducted in accordance with node numbers, in order to search for the maximal clique. The traversal starts from node 0, where NL(0)={1, 2, 3}. First, node 1 having the smallest number is selected from NL(0), then a current clique structure {0, 1} is obtained, and a set of candidate nodes that can be used to expand the current clique structure is TR(0, 1)={2, 3}; then, node 2 having the smallest number is further selected from TR(0, 1), where NL(2)={3, 4}, and the current clique structure is expanded as {0, 1, 2}. Because TR(1, 2)=TR(0, 1) n NL(2)={3}, it is necessary to continue to recursively construct a set TR(2, 3) from nodes 2 and 3 to further expand the current clique structure {0, 1, 2}. However, because TR(2, 3)=TR (1, 2) n NL(3)={ }, a candidate maximal clique {0, 1, 2, 3} is obtained, and the process returns to node 1. Because the traversal has been conducted for node 2 in TR(0, 1)={2, 3}, node 3 is selected to expand the clique structure {0, 1}. The traversal starts from node 3, where TR(1, 3)=TR(0,1)∩NL (3)={ }. Therefore, a candidate maximal clique {0, 1, 3} is obtained and the process returns to node 1. Because the traversal has been conducted for all nodes in the set TR(0, 1)={2,3}, the process further returns to node 0 and selects a next node 2 from NL(0)={1,2,3} to obtain TR(0,2)={3}. Then, starting from node 3, we find TR(2,3)=TR(0,2) n NL(3)={ }, so that a candidate maximal clique {0, 2, 3} is obtained and the process returns to node 0. Finally, node 3 is selected from NL(0) to find TR(0,3)={ }, and the search process ends.

It can be seen from FIG. 3, because {0,1,3}, {0,2,3} and {1,2,3} are included in {0,1,2,3}, during the traversal search process, it is not necessary to traverse the branches where they locate. The pruning strategy is used for the purpose of reducing unnecessary traverse steps. Particularly, the maximal clique {0,1,2,3} that has been found is labeled by 0, and label 0 is set for each node in this maximal clique. When expanding from internal nodes {0,1}, {0,2}, {1,2}, respectively, they have the same clique label as their expansion nodes, indicating that these clique structures are included in the known maximal clique, and hence these branches may not be processed. In FIG. 3, the dotted portions are branches that may be cut off. For branches from {1} to {1,2,4}, because nodes 1, 2, 4 do not share the same clique label, the traversal operation is to be conducted.

Figure 4:
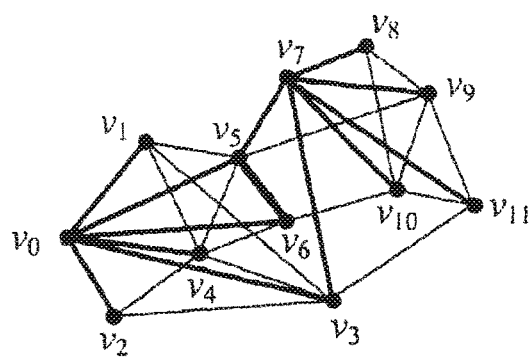
FIG. 4 is a schematic diagram of identifying a core clique in the microblog user association network provided in an embodiment of this invention.

104: acquiring at least one core clique based on the maximal cliques; as shown in FIG. 4, in this step, on the basis of the structure of the maximal cliques, the social relation circle of each user node is analyzed. The structure of the core cliques in the network is filtered out based on an inclusion-consolidation strategy on the social relation circles. For any two nodes vi, vj, if the social relation circle of vi covers a vast majority of the social relation circle of vj, i.e., |Ci∩Cj|/|Cj|>f, it is considered that Ci includes Cj and they should be consolidated. If Ci is not included by any other social relation circle, Ci is considered as a network core. In FIG. 4, node v0 is included in four maximal cliques; the four maximal cliques are as follows: C0={{v0,v1,v4, v5}, {v0,v1,v3,v4}, {v0,v2,v3,v4}, {v0,v4,v5,v6}}; For node v1, because its social relation circle C1={{v0,v1,v4, v5}, {v0,v1,v3,v4}} is a proper subset of the social relation circle C0 of node v0, it can be seen intuitively that, nodes v0 and v1 are actually within the same closely associated community, and hence C1 cannot become a core of the network shown in FIG. 4 independently. Similarly, C2, C3, C4, C5 are also included in C0, while C8, C9, C10, C11 are included in C7={{v3,v7,v11}, {v7,v8,v9,v10}, {v7,v9,v10, v11}}. Because |C1∩C7∩/|C7|=0, C1 and C7 are two cores of the network shown in FIG. 4.

It should be noted that there are common nodes among the found cores. In order to avoid repeatability of the network cores, a dereplication process needs to be performed. For a node vi in the set Common of all common nodes (i.e., common microblog users) and a core Ck in the set Center of network cores, importance of the node vi in a subgraph corresponding to Ck is calculated in accordance with the Fream centrality, particularly with the following equation:

$$C_F(v_i) = \frac{d_i}{|G(C_k)|_v - 1},$$

wherein the numerator represents the node degree of node $d_i$ in the graph $G(C_k)$, and the denominator represents the number of nodes contained in the graph $G(C_k)$. The higher the Fream centrality is, the more important the node is with respect to the core. In the case wherein the Fream centralities are the same, ratios of the central tendency to $|C_{F\ max} - C_F(v_i)|$ of two cores may be further compared, with the following equation:

$$R(v_i, G(C_i)) = \frac{C_F(G(C_i))}{|C_{F\ max} - C_F(v_i)|},$$

wherein the smaller $|C_{F\ max} - C_F(v_i)|$ is, the closer the node vi is to the center of the core; and the larger numerator is, the stronger the centrality is.

105: conducting behavior analysis on the user groups in the microblog based on the acquired maximal clique and/or the acquired core clique. For example, the behavior analysis on the user groups in the microblog mainly comprises the analysis of geographic distribution, age composition, sex ratio, and professional background and the associated analysis thereof. The Apriori algorithm is used in association rule mining. The basic idea of the Apriori algorithm is that, first, making a simple statistic on the occurrence frequency of item sets including one element, and find out those item sets having support not smaller than a minimum support, i.e., the largest one-dimensional item sets; the loop process starts from the second step, until no other largest item set is produced. The loop process comprises: at the k-th step, generating K-dimensional candidate item sets in accordance with the largest (k−1) dimensional item sets produced at the (k−1) step, then searching for the database to get an item support of the candidate item sets, which is then compared with the minimum support to find out the largest K-dimensional item sets.

It should be noted that, the method of discovering and analyzing structures of user groups in a microblog further comprises:

based on the core cliques, merging remaining microblog users in the microblog user association network into a corresponding nearest network core clique in accordance with a certain distance definition. With this step, on the basis of the dereplicated structure of the core cliques, nodes that are not contained in the network cores are merged into the nearest network cores by utilizing a distance based core expansion method. For example, after the dereplication of all network cores, each element in a set K (a set composed of network cores) is used as a clustering center. Assume that a set of all nodes that are covered by the set K is represented by Vk, then all nodes of V(G)–Vk will be assigned to a nearest network core in K (V(G) is the set of all the nodes). The out-of-core node merging process comprises: first, all nodes in the set Vk are labeled as "old" (used). Next, regarding all nodes at a distance of "one hop" to a node in Vk but not being labeled as "old", i.e. $v_i \in V_E \cup N(v_k)-V_K$, $V_k \in V_K$, because vi is not labeled as "old", it is assigned to a nearest core in K, such that each core of the set K is expanded correspondingly. Then, each element of the set VE is labeled as "old", and VE is updated to VE' such that regarding the node in VE' that has a distance of "one hop" from a node in VE and is not labeled as "old", it is assigned to a nearest core in K. This process is performed iteratively until all nodes are labeled as "old".

The core cliques of the microblog user association network are consolidated by utilizing a hierarchical clustering algorithm to obtain a final structure partition on the user groups in the microblog. In this step, in accordance with network modularity, an index for the quality (good or poor) of the community partition, the hierarchical clustering algorithm is used to consolidate candidate community structures (i.e., the acquired core cliques). For example, starting from an existing initial partition, an increment Q of the network modularity is optimized with a local greed algorithm, in which two candidate community structures that can maximize Q (Q>0) are consolidated iteratively every time until Q is less than or equal to 0. Assume that the modularity of the initial community partition structure is Q0, and when two communities i and j are consolidated, the consolidated community is represented by (ij), then $Q=a_{ij}-a_{(ij)}^2+a_i^2+a_j^2$, wherein $a_i=M_i/M$ if i is connected with j, or otherwise, Q=0. Wherein, $a_i=M_i/M$, Mi is the number of edges that connect all nodes in community i. aij is a ratio of edges that connect nodes in community i to nodes in community j.

Figure 5:
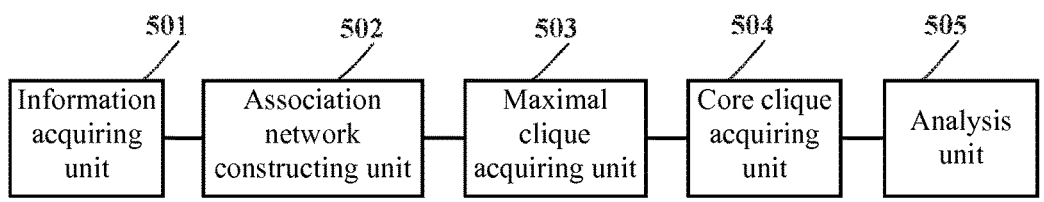
FIG. 5 is a schematic structural diagram of a system of discovering and analyzing structures of user groups in a microblog provided in an embodiment of this invention.

As shown in FIG. 5, a system of discovering and analyzing structures of user groups in a microblog is provided in an embodiment of this invention, comprising:

an information acquiring unit 501, configured to acquire information on behavior data of microblog users of a target group;

an association network constructing unit 502, configured to construct a microblog user association network based on the information on behavior data of the microblog users of the target group;

a maximal clique acquiring unit 503, configured to acquire at least one maximal clique from the microblog user association network;

a core clique acquiring unit 504, configured to acquire at least one core clique based on the maximal clique, and an analysis unit 505, configured to conduct behavior analysis on the user groups in the microblog based on the acquired maximal clique and/or the acquired core clique.

Wherein, the association network constructing unit 502 comprises: establishing association relationships among the microblog users by utilizing a association relationship evaluation model, based on the information on behavior data of the microblog user of the target group; constructing the microblog user association network which is composed of a microblog user used as a node and an association relationship used as an edge, based on the established association relationships among the microblog users.

The maximal clique acquiring unit 503 particularly comprises: obtaining all maximal cliques of the microblog user association network by utilizing a search-triangle based method operated with a certain pruning strategy.

The core clique acquiring unit 504 particularly comprises: based on the maximal cliques, analyzing a social relation circle of each microblog user and all other microblog users, and filtering out the core cliques of the microblog user association network based on an inclusion-consolidation strategy on the social relation circles.

It should be noted that the core clique acquiring unit further comprises: acquiring a common microblog user existing among the core cliques; re-partitioning the common microblog user into a corresponding core clique such that there is no common microblog user among respective core cliques.

Based on the above described core clique acquiring unit, the system further comprises:

a merging unit, configured to based on the core cliques, merge remaining users in the microblog user association network into a corresponding nearest network core clique in accordance with a certain distance definition;

an optimization unit, configured to consolidate the core cliques of the microblog user association network by utilizing a hierarchical clustering algorithm to obtain a final structure partition on the user groups in the microblog.

The method and system of discovering and analyzing structures of user groups in a microblog provided in this invention acquires information on behavior data of microblog users of a target group; constructs a microblog user association network based on the information on behavior data of the microblog users of the target group; acquires at least one maximal clique from the microblog user association network; acquires at least one core clique based on the maximal clique; and conducts behavior analysis on the user groups in the microblog based on the acquired maximal clique and/or the acquired core clique. Using the method and system of discovering and analyzing structures of user groups in a microblog provided in this invention, complicated relationships among the microblog users may be sufficiently identified and the speed of discovering and analyzing microblog user group structure may be improved to meet the demand for large scaled data processing.

One or more computer-readable mediums having computer executable instructions thereon are also provided in this disclosure, the instructions, when executed by a computer, performing the method of discovering and analyzing structures of user groups in a microblog, characterized in comprising: acquiring information on behavior data of microblog users of a target group; constructing a microblog user association network based on the information on behavior data of the microblog users of the target group; acquiring at least one maximal clique from the microblog user association network; acquiring at least one core clique based on the maximal clique, and conducting behavior analysis on the user groups in the microblog based on the acquired maximal clique and/or the acquired core clique.

A computer including one or more computer-readable mediums having computer executable instructions thereon is also provided in this disclosure, the instructions, when being executed by the computer, performing the method of discovering and analyzing structures of user groups in a microblog.

Exemplary Operation Environment

The computing device/computer as described herein comprises hardware, including one or more processors or processing units, a system memory and a certain type of computer readable medium. By way of example and not limitation, the computer readable medium comprises computer storage medium and communication medium. Computer storage medium comprises volatile and non-volatile, removable and non-removable medium implemented with any method or technology for storage of information such as computer readable instructions, data structures, program modules or other data. Communication medium typically embodies computer readable instructions, data structures, program modules, or other data with a modulated data signal such as a carrier wave, other transport mechanisms, or the like, and includes any information delivery medium. Combinations of any of the above are also included within the scope of the computer readable medium.

The computer may operate in a networked environment using logical connections to one or more remote computers, such as remote computers. Although a description has been given in combination with an exemplary computing system environment, various embodiments of this invention are applicable to numerous other general or dedicated computing system environments or configurations. The computing system environment is not intended to suggest any limitation as to the scope of use or functionality of any aspect of this invention. Moreover, the computer environment should not be interpreted as having any dependency or requirement with respect to any one or combination of components illustrated in the exemplary operating environment. Examples of well known computing systems, environments, and/or configurations that may be suitable for use with aspects of this invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of this invention may be described in the general context of computer-executable instructions, such as program modules, executed by one or more computing devices. The computer-executable instructions may be organized, as software, into one or more computer-executable components or modules. Generally, program modules include, but are not limited to, routines, programs, objects, components, and data structures that perform particular tasks or implement particular abstract data types. Aspects of this invention may be implemented with any number of such components or modules and the organization thereof. For example, aspects of this invention are not limited to the specific computer-executable instructions or the specific components or modules illustrated in the figures and described herein. Other embodiments of this invention may include different computer-executable instructions or components having more or less functionality than those illustrated and described herein. Aspects of this invention may also be practiced in distributed computing environments where tasks are performed by remote processing devices that are linked through a communications network. In a distributed computing environment, program modules may be located in both local and remote computer storage medium including memory storage devices.

It can be understood by those skilled in the art that the whole or parts of the steps of the method in the above embodiments can be realized by computer program instructing related hardware, the computer program may be stored in a computer readable storage medium, when the program is executed, it can include the following steps: (the steps of the above method). The storage medium can be diskette, compact disc, Read-Only Memory (ROM) or Random Access Memory (RAM), or the like.

The preceding is only specific implementations of this invention, but the protection scope of this invention is not limited thereto. Any change or replacement that can be easily figured out by persons skilled in the art within the technical scope disclosed by this invention shall all fall within the protection scope of this invention. Therefore, the protection scope of this invention shall be subject to the protection scope defined by the claims.

The invention claimed is:

1. A method performed by a processor of discovering and analyzing structures of user groups in a microblog, characterized in comprising:

acquiring, by the processor, information on behavior data of microblog users of a target group;

constructing, by the processor, a microblog user association network based on the information on behavior data of the microblog users of the target group;

acquiring, by the processor, at least one maximal clique from the microblog user association network;

acquiring, by the processor, at least one core clique based on the maximal clique;

conducting, by the processor, behavior analysis on the user groups in the microblog based on the acquired maximal clique and/or the acquired core clique, wherein the step of acquiring, by the processor, at least one maximal clique particularly comprises:

acquiring, by the processor, all maximal cliques of the microblog user association network by utilizing a search-triangle based method operated with a certain pruning strategy, and wherein the step of acquiring, by the processor, at least one core clique particularly comprises:

based on the maximal cliques, analyzing, by the processor, a social relation circle of each microblog user and all other microblog users, and filtering out, by the processor, the core cliques of the microblog user association network based on an inclusion-consolidation strategy on the social relation circles, wherein if a social relation circle of one microblog user is not included by any of the other social relation circles, the social relation circle of the one microblog user is filtered out as one of the core cliques.

2. The method of discovering and analyzing structures of user groups in a microblog according to claim 1, characterized in that, the step of constructing, by the processor, a microblog user association network comprises:

establishing, by the processor, association relationships among the microblog users by utilizing an association relationship evaluation model, based on the information on behavior data of the microblog users of the target group; and constructing, by the processor, the microblog user association network which is composed of a microblog user used as a node and an association relationship used as an edge, based on the established association relationships among the microblog users.

3. The method of discovering and analyzing structures of user groups in a microblog according to claim 1, characterized in that, the step of acquiring at least one core clique further comprises:

acquiring, by the processor, a common microblog user existing among the core cliques;

re-partitioning, by the processor, the common microblog user into a corresponding core clique such that there is no common microblog user among respective core cliques.

4. The method of discovering and analyzing structures of user groups in a microblog according to claim 3, characterized in that, the method further comprises:

based on the core cliques, merging, by the processor, remaining users in the microblog user association network into a corresponding nearest network core clique in accordance with a certain distance definition;

consolidating, by the processor, the core cliques of the microblog user association network by utilizing a hierarchical clustering algorithm to obtain a final structure partition on the user groups in the microblog.

5. A system of discovering and analyzing structures of user groups in a microblog, which comprises a processor, characterized in that the processor is configured to perform the operations of:

acquiring information on behavior data of microblog users of a target group;

constructing a microblog user association network based on the information on behavior data of the microblog users of the target group;

acquiring at least one maximal clique from the microblog user association network;

acquiring at least one core clique based on the maximal clique;

conducting behavior analysis on the user groups in the microblog based on the acquired maximal clique and/or the acquired core clique, wherein the operation of acquiring at least one maximal clique particularly comprises:

acquiring all maximal cliques of the microblog user association network by utilizing a search-triangle based method operated with a certain pruning strategy, and wherein the operation of acquiring at least one core clique particularly comprises:

based on the maximal cliques, analyzing a social relation circle of each microblog user and all other microblog users, and filtering out the core cliques of the microblog user association network based on an inclusion-consolidation strategy on the social relation circles, wherein if a social relation circle of one microblog user is not included by any of the other social relation circles, the social relation circle of the one microblog user is filtered out as one of the core cliques.

6. The system of discovering and analyzing structures of user groups in a microblog according to claim 5, characterized in that, the operation of acquiring information on behavior data of microblog users of a target group comprises: establishing association relationships among the microblog users by utilizing an association relationship evaluation model, based on the information on behavior data of the microblog users of the target group; and constructing the microblog user association network which is composed of a microblog user used as a node and an association relationship used as an edge, based on the established association relationships among the microblog users.

7. The system of discovering and analyzing structures of user groups in a microblog according to claim 5, characterized in that, the operation of acquiring at least one core clique further comprises: acquiring a common microblog user existing among the core cliques; re-partitioning the common microblog user into a corresponding core clique such that there is no common microblog user among respective core cliques.

8. The system of discovering and analyzing structures of user groups in a microblog according to claim 7, characterized in that, the processor is further configured to perform the operations of:

based on the core cliques, merging remaining users in the microblog user association network into a corresponding nearest network core clique in accordance with a certain distance definition;

consolidating the core cliques of the microblog user association network by utilizing a hierarchical clustering algorithm to obtain a final structure partition on the user groups in the microblog.

* * * * *